United States Patent [19]

Kato

[11] Patent Number: 4,839,766
[45] Date of Patent: Jun. 13, 1989

[54] DISK CARTRIDGE WITH IMPROVED SHUTTER MOVING MECHANISM

[75] Inventor: Yoshitake Kato, Ibaraki, Japan

[73] Assignee: Hitachi Maxwell Ltd., Osaka, Japan

[21] Appl. No.: 95,776

[22] Filed: Sep. 14, 1987

[30] Foreign Application Priority Data

Sep. 13, 1986 [JP] Japan .................. 61-215007

[51] Int. Cl.$^4$ ............................... G11B 23/03
[52] U.S. Cl. .................................. 360/133
[58] Field of Search ............................ 360/133, 97, 99

[56] References Cited

U.S. PATENT DOCUMENTS 4,517,617 5/1985 Tsuji et al. ..................... 360/133
4,589,105 5/1986 Nemoto et al. ............... 360/133

FOREIGN PATENT DOCUMENTS 0137965 4/1985 European Pat. Off. .
60-43279 7/1985 Japan .

Primary Examiner—Robert S. Tupper
Attorney, Agent, or Firm—Antonelli, Terry & Wands

[57] ABSTRACT

A disk cartridge having a cartridge casing provided with head entry apertures and rotatably housing a disk recording mechanism. A shutter opens and closes the head entry apertures. Springs elastically urge the shutter in the closing direction. The shutter has at least cover parts for closing the head entry apertures. A front plate is integrally connected to the cover parts and is slidable along the front surface of the cartridge casing. An engaging part engages with a shutter opening member, and is provided at the end of at least one side of the front plate so as to project forward from the front plate.

20 Claims, 17 Drawing Sheets

F I G. 3a
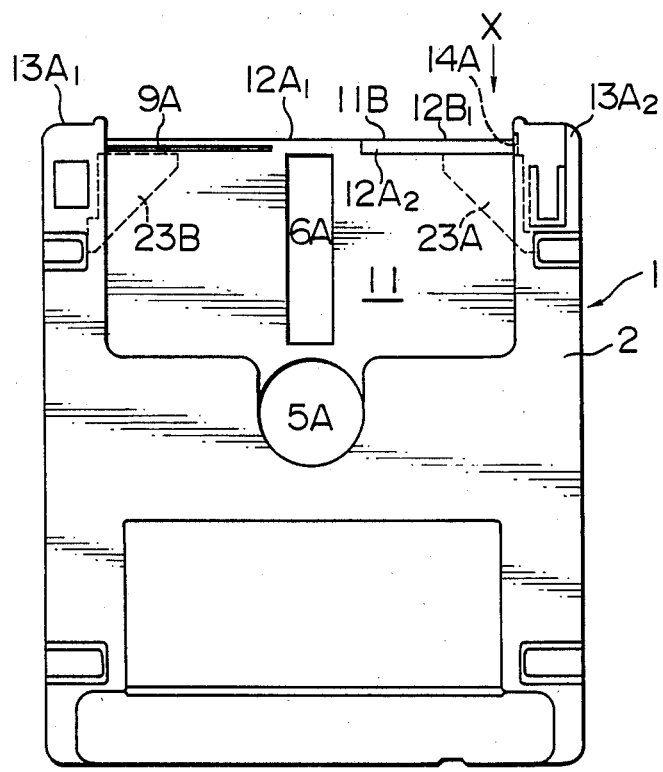
F I G. 3b
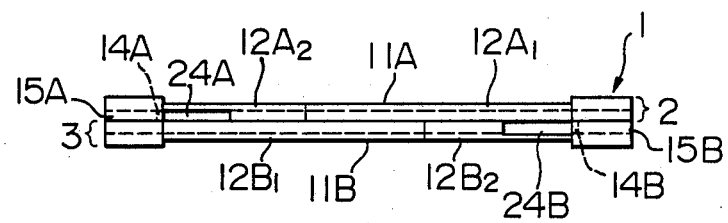

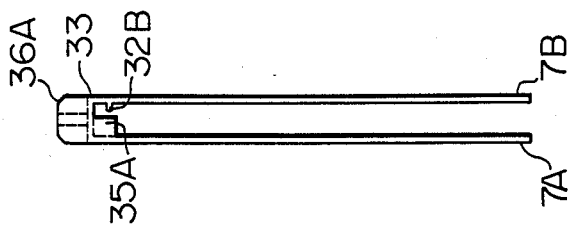
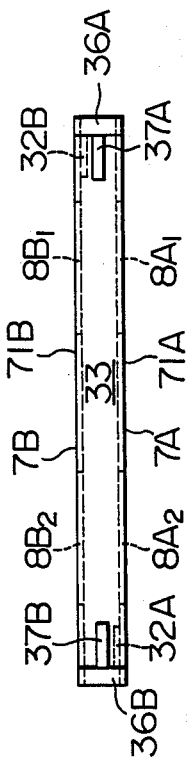
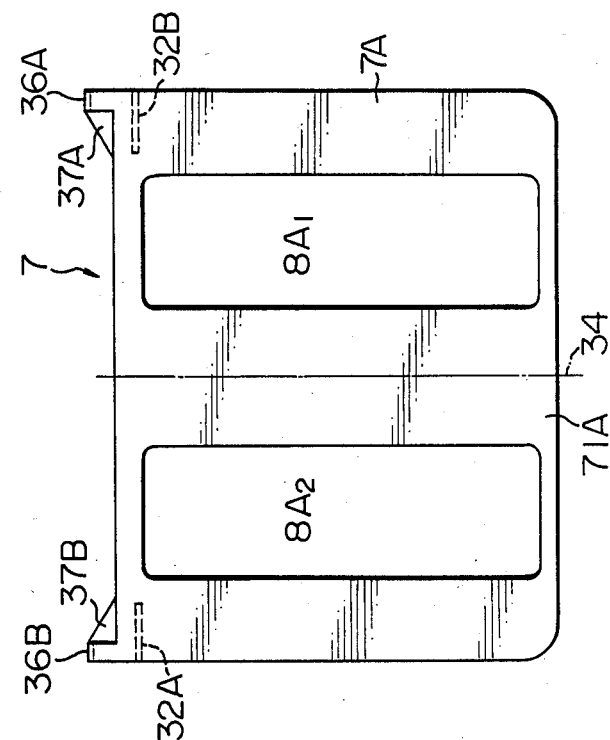
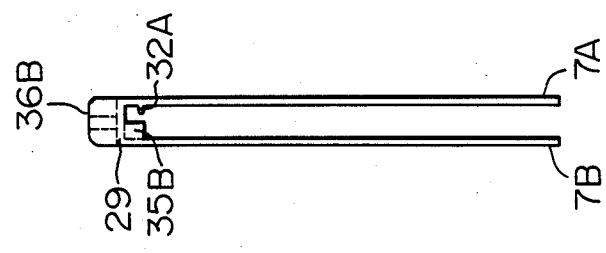

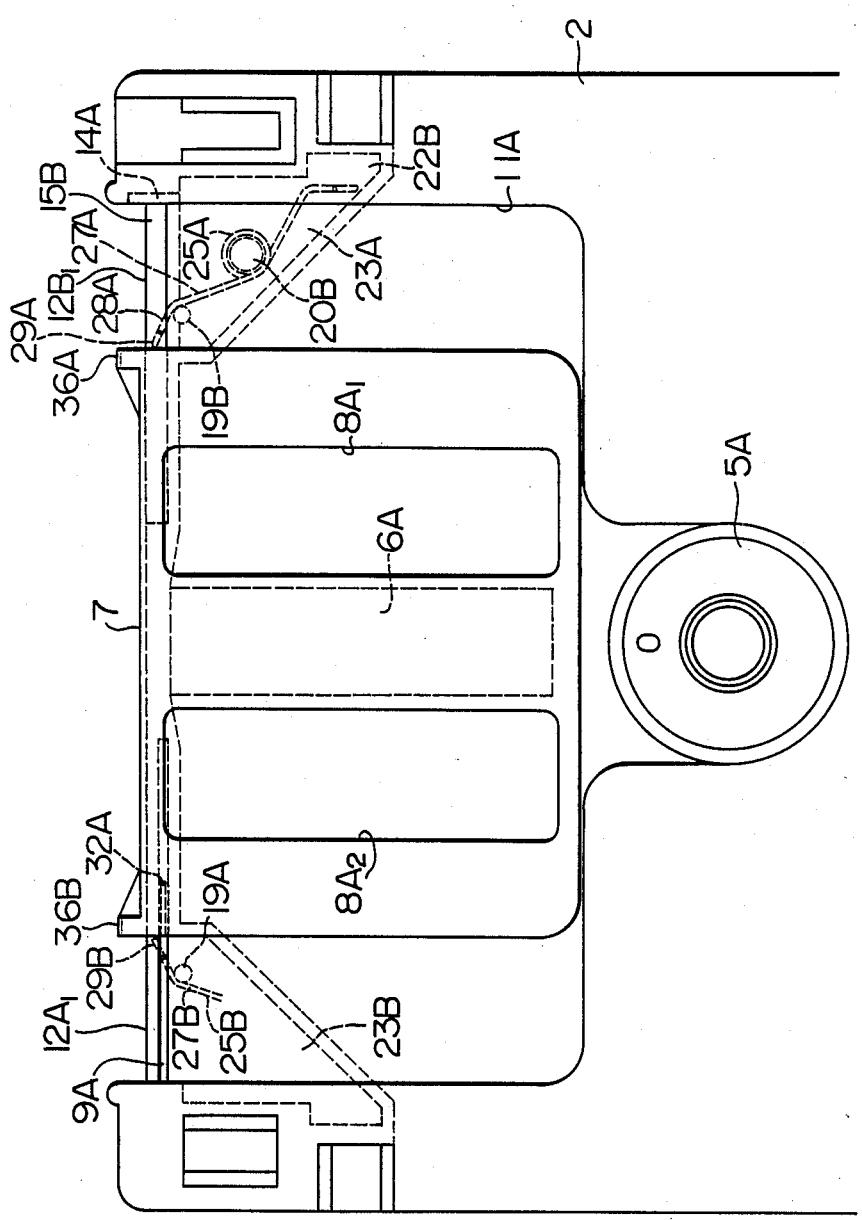

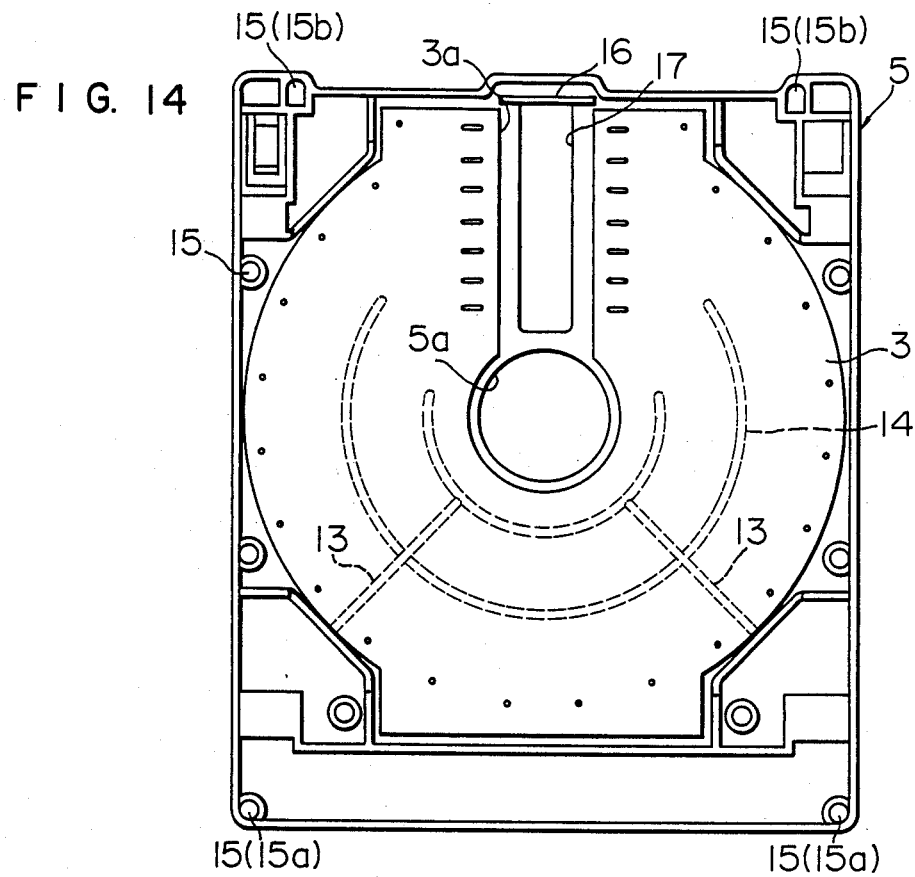
F I G. 14
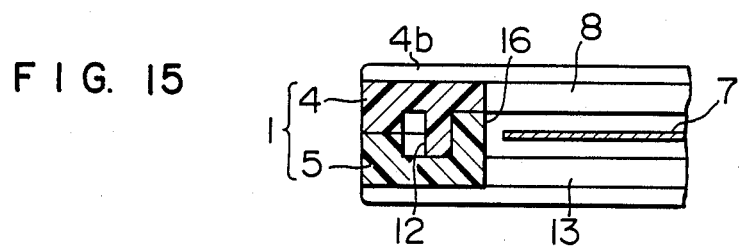
F I G. 15
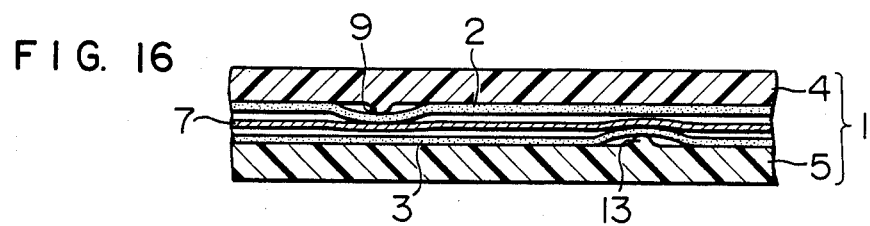
F I G. 16

DISK CARTRIDGE WITH IMPROVED SHUTTER MOVING MECHANISM

BACKGROUND OF THE INVENTION

1. FIELD OF THE INVENTION

The present invention relates to a disk cartridge in which a double-sided disk is housed, and particularly to shutter device for opening and closing head entry apertures formed on both surfaces of the disk cartridge.

2. DESCRIPTION OF THE PRIOR ART

In terms of the ease of handling and protection from dust, disk recording media, such as magnetic disk and optical disk, are loaded to a recording and reproduction apparatus with the disk being still housed in a disk cartridge to accomplish the recording and reproduction of information. Therefore, a cartridge case that is the main body of a disk cartridge is provided with a head entry aperture so that the head can be brought into contact with the disk recording medium when the cartridge is loaded to a recording and reproduction apparatus. However, when a head entry aperture is provided in this manner, some disadvantages occur. For example, when the disk cartridge is not used, dust enters the cartridge case through this head entry aperture and adheres to the recording surface of the disk recording medium. In another instance, during the handling of a disk cartridge, a finger tapperedly comes into contact with the recording surface of the disk cartridge through this head entry aperture, thus contaminating the recording surface with the dust or damaging it. As a result, good recording and reproduction become impossible. For this reason, a disk cartridge is usually provided with a shutter that closes the head entry aperture if the disk cartridge is not used.

FIGS. 17a and 17b are plan views illustrating an example of such conventional disk cartridge (for example, Japanese Patent laid-Open No. 38388/82). FIG. 17a shows the front surface side and FIG. 17b the reverse surface side. The reference numeral 1 denotes a cartridge casing, 2 an upper casing, 3 a lower casing, 4 a disk recording medium, 5A and 5B a spindle holes, 6A and 6B a head entry aperture, 7 a shutter, 7A and 7B shutter surfaces, and 8A and 8B an openings.

In the figures, the cartridge casing 1 is composed of the upper casing 2 and the lower casing 3 which are internally incorporated with each other and the double-sides disk recording medium 4 is housed in it. The spindle hole 5 of the same diameter are provided almost in the center of each of the upper casing 2 and lower casing 3 coaxial with the disk recording medium 4. Furthermore, on the forward side (upper side of the figures) with respect to the spindle holes 5 of the upper casing 2 and lower casing 3, the head entry apertures 6A and 6B of the same shape are formed in a manner that they readily cross the whole recording area of the disk recording medium 4 and they are superposed on each other.

The U-like shutter 7 is installed on this cartridge casing 1 in a manner that the cartridge casing is sandwiched between both sides of the shutter 7. The opening 8A is found in the shutter surface 7A of the upper casing 2 of this shutter 7 (FIG. 17a) on the right side from the center as viewed in the figure. The opening 8B is formed in the shutter surface 7B of the lower casing 3 of this shutter 7 (FIG. 17b) on the left side from the center as viewed in the figure. These openings 8A and 8B are arranged so that they are superposed with each other; the openings 8A and 8B have almost the same shape as the head entry apertures 6A and 6B and are a little larger than the head entry apertures 6A and 6B.

This shutter 7 is slidable in the directions indicated by the arrows A and B with respect to the cartridge casing 1.

When this disk cartridge is not used, the shutter 7 is urged to one end of the slidable range, as shown in the figure, whereby the head entry apertures 6A and 6B are closed. However, when this disk cartridge is to be used, the shutter 7 is moved in the direction indicated by the arrow A and is urged to the other end of the slidable range. As a result, the opening 8A of the shutter 7 is set in a position including the head entry aperture 6A of the upper casing 2 and the opening 8B is set in a position including the head entry aperture 6B of the lower case 3, whereby the head entry apertures 6A and 6B open. When this disk cartridge 1 is inserted in a recording and reproduction apparatus after that, the head comes into contact with one of the two recording surfaces of the disk recording medium 4 through either of the head entry apertures 6A and 6B and the pad comes into contact with the other recording surface through the other head entry aperture. A spindle is inserted through the spindle hole 5A or 5B to receive the disk recording medium 4 thereon. When the disk cartridge 1 is to be taken out of the recording and reproduction apparatus, the head entry apertures 6A and 6B can be closed by moving the shutter 7 in the direction indicated by the arrow B.

Incidentally, in a disk cartridge of the above-mentioned construction, the shutter 7 is adapted to be moved only in the direction indicated by the arrow A with respect to the cartridge casing 1 in order to open the head entry apertures 6A and 6B. Therefore, if the disk cartridge is used with the upper casing 2 shown in FIG. 7a facing upward and information is to be recorded or reproduced with the other surface of the disk recording medium 4, the shutter 7 must be moved in the direction indicated by the arrow A in order to open the head entry aperture A because the shutter rests at the right end of the slidable area. In contrast, if the recording or reproduction of information is to be conducted with the other recording surface of the disk recording medium 4, the disk cartridge is on the side reverse to the condition shown in FIG. 17a and is used with the lower casing 3 facing upward and the shutter 7 rests at the right end of the slidable range as shown in the figure; therefore, the shutter 7 must be moved in the direction indicated by the arrow A in order to open the head entry aperture 6B. In this case, the direction indicated by the arrow A in FIG. 17b is opposite to the direction indicated by the arrow A in FIG. 17a as viewed from the recording and reproduction apparatus.

As is apparent from the foregoing, when this type of cartridge is used, the moving direction of the shutter 7 in the recording and reproduction apparatus must be changed depending on which recording surface of the disk recording medium 4 is used to record or reproduce information and the necessity of two sets of shutter moving mechanisms makes the construction of the recording and reproduction complex.

To cope with this problem, it has been proposed in Japanese Patent Laid-Open No. 43279/85, to provide a disk cartridge in which the shutter is moved only in one direction to open a head entry aperture in a recording and reproduction apparatus even when information is recorded or reproduced using either of the recording surfaces of a disk recording medium.

FIGS. 18a and 18b are plan views illustrating this disk cartridge disclosed in Japanese Patent Laid-Open No. 43279/85. FIG. 18a shows the front surface side and FIG. 18b the reverse surface side. The same reference characters are given to the parts corresponding to those shown in FIGS. 17a and 17b.

The shutter 7 of this disk cartridge has a form of the letter U and is attached in a manner that the cartridge casing 1 is sandwiched by it. However, neither the shutter surface 7A nor the shutter surface 7B has opening and the shutter surfaces are rectangular and large enough to sufficiently cover the head entry apertures 6A and 6B and the spindle holes 5A and 5B. This shutter 7 is slidable along a guide groove 9A and a guide groove 9B made in the upper casing 2 and lower casing 3 of the cartridge casing 1, respectively. However, when the disk cartridge is not used, the shutter 7 is in the middle of the width direction of the cartridge casing 1 and is pressed by a spring 10A and a spring 10B so that the spindle holes 5A and 5B and the head entry apertures 10A and 10B are all closed.

When the disk cartridge is used with the upper casing 2 in FIG. 18a facing upward and information is recorded or reproduced with one of the two recording surfaces of the disk recording medium 4, the shutter 7 is moved against the urging force of the spring 10 by means of a shutter moving mechanism not shown in the figure in the direction indicated by the arrow A up to the end of the slidable range. As a result, the spindle hole 5A and the head entry aperture 6A are opened. At this time, on the reverse side (i.e., the side of the lower casing 3) of the disk cartridge shown in FIG. 18b, the shutter 7 moves in the direction indicated by the arrow B with respect to the lower casing 3 and the spindle hole 5B and the head entry aperture 6B are also opened.

When information is recording or reproduced on the recording surface of the disk recording medium 4 on the reverse side of the above-mentioned recording surface, the disk cartridge is used with the lower casing 3 facing upward as shown in FIG. 18b. In this case, the spindle hole 5B and the head entry aperture 6B are opened by moving the shutter 7 against the urging force of the spring 10A (FIG. 18a) in the direction indicated by the arrow A (this direction being the same direction as indicated by the arrow A in FIG. 18a with respect to the recording and reproduction apparatus). At this time, on the front surface side (i.e., the side of the upper case 7) of the disk cartridge shown in FIG. 18a, the shutter 7 has moved in the direction indicated by the arrow B with respect to the upper casing 2 and the spindle hole 5A and the head entry aperture 6A are also opened.

As will be understood from the foregoing, in the disk cartridge of the above-mentioned construction, the shutter 7 is moved only in one direction when information is recorded or reproduced with both of the recording surfaces of the disk recording medium 4. Therefore, the shutter moving mechanism is simplified and the construction of the recording and reproduction is simple. Furthermore, it is possible to substantially prevent dust from entering the spindle holes 5A and 5B.

When the above-mentioned disk cartridge proposed is used, it is necessary to move the shutter located in the middle of the slidable range up to its end in order to open the spindle holes and head entry apertures. In FIGS. 18a and 18b, therefore, the shutter moving mechanism is provided on a straight line between the spindle holes 5A and 5B and the head entry aperture 6A and 6B. Because the cartridge mechanism for moving the head, pad, etc. is also installed on this straight line, it is very difficult to arrange the shutter moving mechanism, and further this mechanism is complex and large.

Therefore, if both sides of the shutter are each provided with one engaging part that engages with a shutter moving mechanism in which the shutter surfaces 7A and 7B of the shutter 7 move in the reverse directions indicated by the arrows A and B with respect to each other and that do not cross the head entry apertures 6A and 6B in FIGS. 18a and 18b and if the shutter 7 is pushed or pulled in the direction indicated by the arrow A in these engaging parts, it is possible to arrange one shutter moving mechanism sufficiently apart from the straight line between the spindle holes 5A and 5B and the head entry apertures 6A and 6B of the disk cartridge.

However, the shutter 7 is very thin. Furthermore, the rigidity of the shutter 7 is very low because it is usually made of plastic from the standpoint of fabrication and cost. Therefore, the mechanical strength of the above-mentioned engaging parts is very low. For this reason, the engaging parts may sometimes be bent when the shutter 7 is to be moved by pushing the ends of the engaging parts. Especially, because the shutter surface 7A and 7B are very narrow, the shutter 7 rattles greatly if there are backlashes between the guide grooves 9A and 9B and the engaging parts (not shown in the figures) of the shutter 7 which engage with these guide grooves. As a result, the engaging parts are easily bent and it becomes impossible to move the shutter 7 smoothly.

OBJECT OF THE INVENTION

It is the object of this invention to provide a disk cartridge in which the above-mentioned problem is solved, arrangement conditions for the shutter moving mechanism can be relaxed and the shutter can be moved smoothly.

To achieve the above-mentioned object, the present invention provides a disk cartridge in which the two shutter surfaces of a U-like shutter each have a cover part, an opening is provided on each side of the cover part, the width of the shutter is increased, and the head entry holes in the cartridge casing can be opened through the above-mentioned openings.

The present invention provides also a disk cartridge having a cartridge casing provided with head entry apertures, a disk recording medium rotatably housed in the cartridge casing, a shutter for opening and closing the head entry apertures of the cartridge casing, and springs for elastically urging the shutter in the closing direction, wherein the shutter has at least cover parts for closing the head entry apertures, a front plate integrally connected to the cover parts and slidable along the front surface of the cartridge casing, and an engaging part that engages with a shutter opening member, which is provided at the end of at least one side of the front plate so as to project forward from the front plate.

Furthermore, the present invention provides a disk cartridge having a cartridge casing provided with head entry apertures a disk recording medium rotatably housed in the cartridge casing, a shutter for opening and closing the head entry apertures of the cartridge casing, and springs for elastically urging the shutter in the closing direction, wherein spring abutting surfaces are provided at the end faces of the shutter, the base parts of the springs are locked in the cartridge casing, the free ends of the springs are elastically connected to the spring abutting surfaces, and the contact positions of the free ends of springs on the spring abutting surfaces can move gradually forward of the shutter by causing the shutter to slide from the closing position to the opening position.

In addition, the present invention provides a disk cartridge wherein both sides of a cartridge casing housing a double-sided disk recording medium are each provided with a head entry aperture and a spindle hole, and a U-like shutter slidably fitted so as to sandwich the cartridge casing enables at least the head entry apertures to open and close, springs for urging the shutter are arranged on both sides of the shutter, and abutting parts against which a shutter opening member abuts, project forward from the forward side of the cartridge casing at both ends of the shutter; is characterized in that the cartridge casing comprises an upper casing and a lower casing, the forward side part of one casing extends forward lower than that of the other opposed casing on the right or left front end side of the center of the cartridge casing in a plan view the above-mentioned extending side edge part serves as a guide for the above-mentioned shutter opening member, and during the closing of the head entry aperture by the shutter, the shutter-side end of the above-mentioned spring for urging the shutter protrudes exceeding the above-mentioned short front side edge part and does not protrude exceeding the above-mentioned extending side edge part.

BRIEF DESCRIPTION OF THE DRAWINGS

The present invention will be detailed hereinbelow in preferred embodiments with reference to the drawings in which:

FIGS. 1a to 8 show a disk cartridge in a first embodiment of the present invention, and more specifically.

FIGS. 1a and 1b are plan views illustrating the upper casing of the disk cartridge;

FIGS. 3a and 3b are plan and front views, respectively, illustrating the disk cartridge in which the upper and lower casings shown in FIGS. 1a and 1b and FIGS. 2a and 2b are integrally incorporated with each other;

FIGS. 6a through 6d are plan, top and side views, respectively, illustrating a shutter adapted to be mounted in the disk cartridge;

FIG. 7 is a plan view illustrating the above-mentioned shutter mounted in the disk cartridge which is partly shown; and FIG. 8 is a plan view illustrating a spring storage section of the disk cartridge which is partly shown in such a condition that a head entry aperture in the disk cartridge is opened.

Furthermore, FIGS. 9 through 16 shows a disk cartridge in a second embodiment of the present invention, and more specifically, FIG. 9 is a plan view illustrating a disk cartridge;

FIG. 10 is a bottom view illustrating the upper casing of the disk cartridge;

FIG. 11 is a sectional view along the line A—A of FIG. 10;

FIG. 12 is a bottom view illustrating the above-mentioned upper casing in which a cleaning sheet is attached;

FIG. 13 is a bottom view illustrating the lower casing of the disk cartridge;

FIG. 14 is a plan view illustrating the above-mentioned lower casing in which a cleaning sheet is attached;

FIG. 15 is a sectional view illustrating a joint part of the disk cartridge in the vicinity of head entry apertures; and FIG. 16 is a sectional view illustrating an essential part of the disk cartridge.

DESCRIPTION OF THE PREFERRED EMBODIMENTS

A first embodiment of the present invention will be described hereinbelow with reference to FIG. 1a to FIG. 8.

Figure 1A:
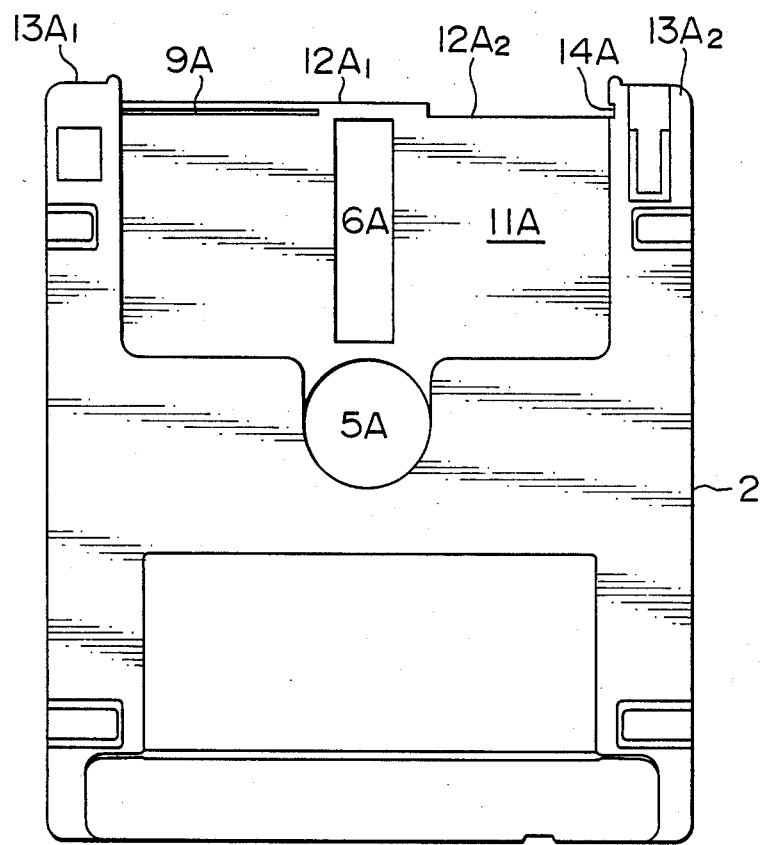
Figure 1B:
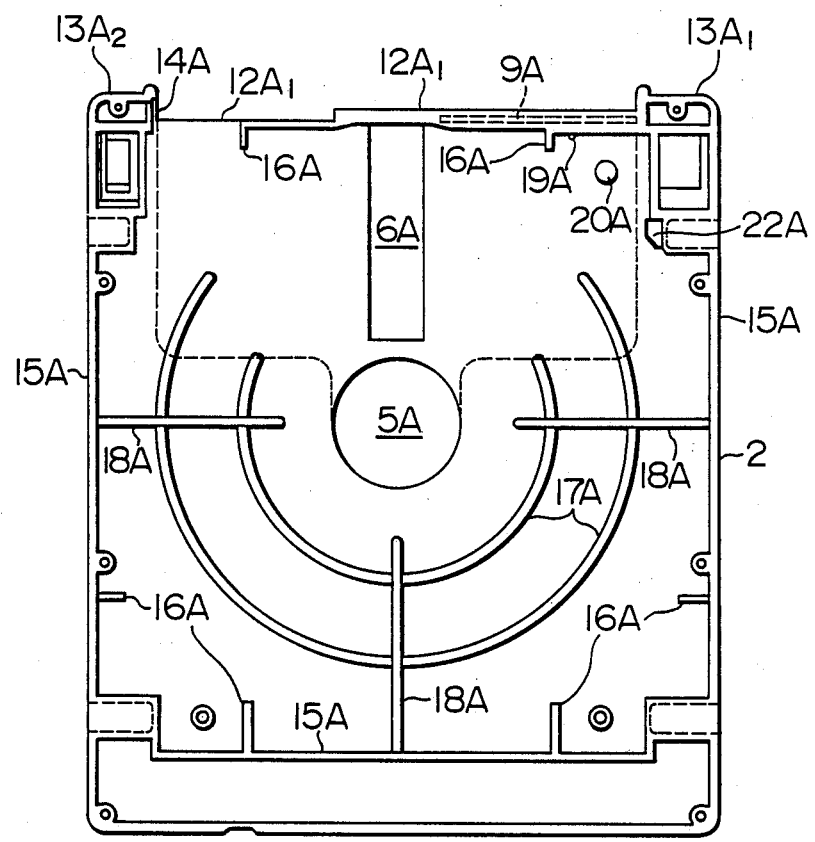
Figure 2A:
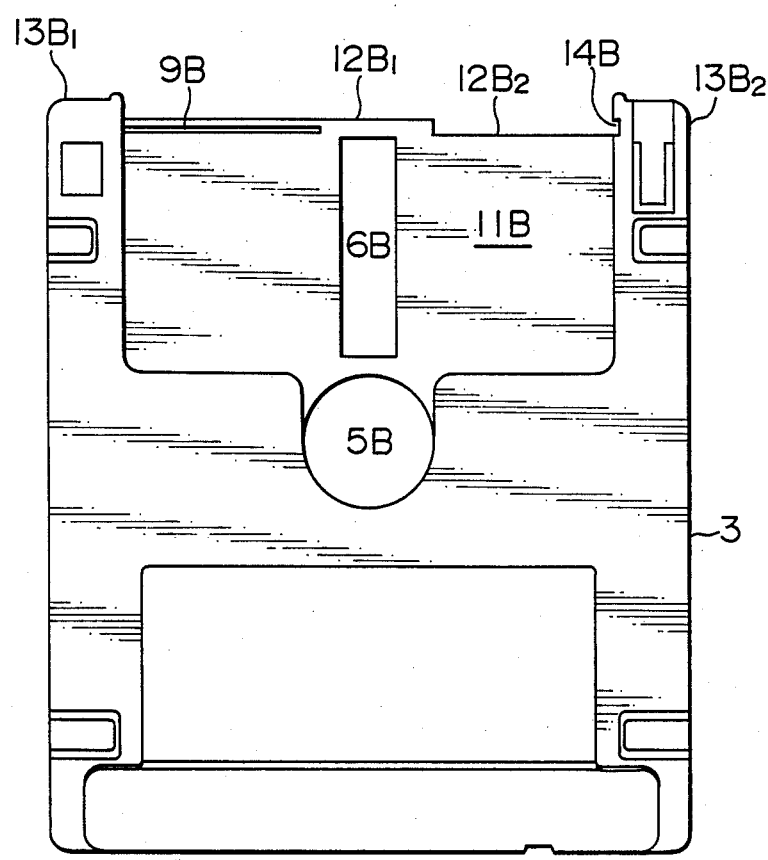
FIGS. 2a and 2b are plan views illustrating the lower casing of the disk cartridge.
Figure 2B:
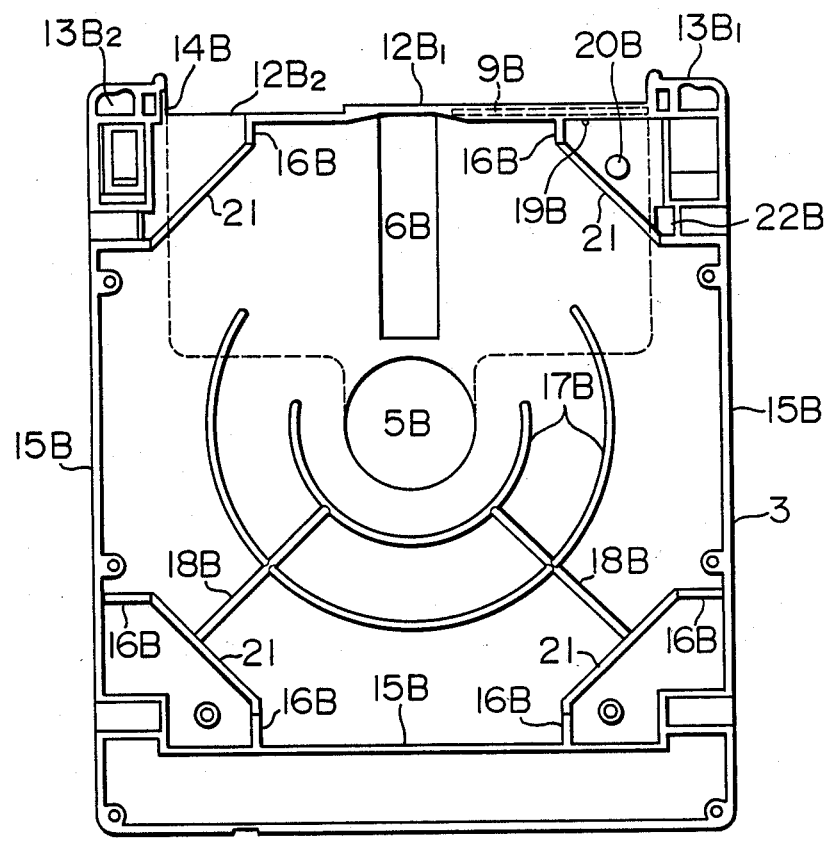

Referring first to FIG. 1a to 2b, the cartridge casing is described. FIGS. 1a and 1b are plan views illustrating the upper casing of the cartridge casing: FIG. 1a is a view as seen from the outside and FIG. 2b a view as seen from the inside (the side facing the disk recording medium). FIGS. 2a and 2b are plan views illustrating the lower casing of the cartridge casing; FIG. 2a is a view as seen from the outside and FIG. 2b a view as seen from the inside. Incidentally, in FIG. 1a to FIG. 2b, the reference numeral 2 denotes an upper casing, 3 a lower casing, 5A and 6B spindle holes 6A and 6B head entry apertures, 9A and 9B guide grooves, 11A and 11B shutter slide parts, $12A_1$, $12A_2$, $12B_1$ and $12B_2$ side edges, $13A_1$ and $13B_1$ forward left corners, $13A_2$ and $13B_2$ forward right corners, 14A and 14B recesses, 15A and 15B side walls, 16A and 16B walls, 17A and 17B arcuate ribs, 18A and 18B radial ribs, 19A and 19B stoppers, 20A and 20B bosses, 21 partition walls, and 22A and 22B denote locking holes.

In FIGS. 1a and 1b, the upper casing 2 is provided with the spindle hole 5A almost at its center and the head entry aperture 6A is provided in the forward part relative to the spindle hole 5A (on the upper side in the figure).

As shown in FIG. 1a, the external surface of this upper casing 2 is slightly depressed in the part forward of the spindle hole 5A to form the shutter slide part 11A. This shutter slide part 11A, which is almost rectangular, includes the head entry aperture 6A and its forward side edge approaches the widthwise side edge of the upper casing 2. The forward side edge of the shutter slide part 11A consists of the two side edges $12A_1$ and $12A_2$ having a boundary therebetween positioned slightly right from the head entry aperture 6A, and the side edge $12A_1$ protrudes forward slightly further from the side edge $12A_2$. The shutter slide part 11A is also provided with the guide groove 9A in the vicinity of the side edge $12A_1$ on the left side of the head entry aperture 6A; this guide groove 9A is parallel to this side edge $12A_1$.

The forward left corner part 13A$_1$ and forward right corner part 13A$_2$ of the upper casing 2 protrude forward further from the side edge 12A$_1$ of the shutter slide part 11A and the side surface of the forward right corner 13A$_2$ on the side of the shutter slide part 11A is formed with the recess 14A opposed to the stepped part between the side edge 12A$_1$ and the side edge 12A$_2$.

As shown in FIG. 1b, the internal surface of the upper casing 2 is provided with the side wall 15A along its sides excepting a part of the side edge 12A$_1$. A plurality of walls 16A of the same height as that of this side wall 15A protrude inward at a plurality of positions in the side wall 15A. The pin-like stopper 19A is provided on the right side of the wall 16 in the vicinity of the side edge 12A$_1$. This stopper 19A is selected to be higher than the side wall 15A. Furthermore, a plurality of arcuate ribs 17A are provided on the inside of the side wall 15A concentrically with the spindle hole 5A and a plurality of radial ribs 18a protrude inward from the side wall 15A radially with respect to the spindle hole 5. The arcuate ribs 17A and radial ribs 18A are lower than the side wall 15. In addition, the boss 20A is provided in the forward right corner part within the side wall 15A on the back side of the shutter slide part 11A; the locking hole 22A is provided lower right to this boss 20A in the figure.

Within this side wall 15A, a disk recording medium (not shown in the figure) is placed having the center spindle hole 5A.

As shown in FIGS. 2a and 2b, the lower casing 3 of the cartridge casing has almost the same internal and external surfaces as the upper casing 2. In FIGS. 2a and 2b, therefore, the character B is used in place of the character A used in FIGS. 1a and 1b for corresponding parts.

As shown in FIG. 2b, however, the internal surface of the lower casing 3 is provided with the partition walls 21 at the ends of the walls 16B protruding from the side wall 15B in such a manner that the partition walls 21 isolate the four corner parts of the lower casing form the remaining part. These partition walls 21 are higher than the side walls 15b and walls 16B.

When springs which will be described later are attached to the bosses 20A and 20B of the upper casing 2 and lower casing 3, the disk recording medium being installed on the internal surface of the lower casing 3, and the upper casing 2 being superposed on the lower casing 3 in such a way that the internal surface of the upper casing 2 faces that of the lower casing 3 and the periphery of the upper casing 2 fits on that of the lower casing 3, the partition walls 20 on the internal surface of the lower casing 3 fit between the ends of walls 16A and the side walls 15A of the upper casing 2 and also between the ends of the two walls 16A of the upper casing, with the result that the upper casing 2 and the lower casing 3 are integrated with each other. The cartridge casing is obtained by welding the two upper and lower casings using ultrasonic heating.

On this occasion, the side walls 15A and 15B of the upper casing 2 and lower casing 3 fit snugly on each other and the walls 16a and 16B also fit tightly on each other. Furthermore, the partition walls 21 of the lower casing 3 are brought into close contact with the internal surface of the upper casing 2. Therefore, the disk recording medium is sealed by the above-mentioned procedure for assembling.

FIG. 3a is a view of illustrating a cartridge casing 1 thus obtained, which is seen from the side of the upper casing 2. In this figure, a part of the shutter slide part 11B of the lower casing 3 on the side edge 12B$_2$ side is seen before the side edge 12A$_2$ of shutter side part 11A of the upper casing 2.

When this cartridge casing is viewed from the direction indicated by the forward arrow X, there is a clearance 24A at left on the side of the upper casing 2 and there is also a clearance 24B at right on the side of the lower casing 3. This clearance 24A serves to partially open the substantially triangular section 23A (FIG. 3a) surrounded by the side wall 15B, wall 16B and partition wall 21 at the forward right corner of the lower casing 3 (FIG. 2b) and by the side wall 15A and wall 16A at the forward left corner of the upper casing (FIG. 1b). The boss 20B, stopper 19B and locking hole 22B (FIG. 2b) are formed in this portion and the spring for automatic return, which will be described later is attached with the aid of these parts. This triangular section 23A is called hereinafter the spring storage section. Similarly, the clearance 24B serves to open the substantially triangular spring storage section 23B in which the boss 20A, stopper 19A and locking hole 22A (FIG. 1b) are installed and a spring is attached using these parts.

Figure 4A:
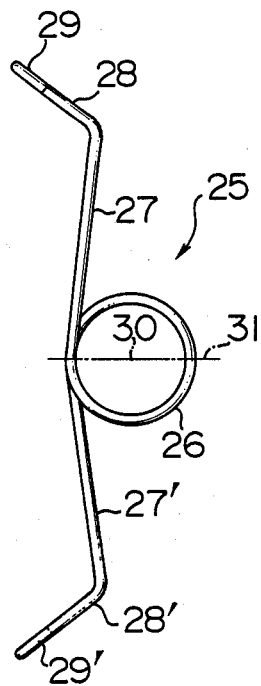
FIGS. 4a and 4b are plan and side views, respectively, illustrating a spring for urging a shutter.
Figure 4B:
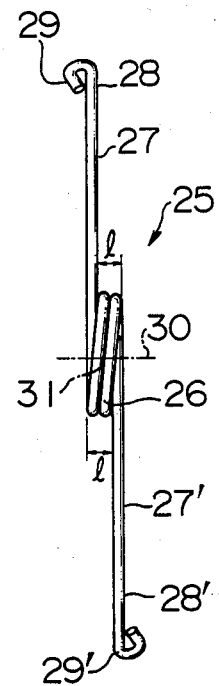

FIG. 4a is a plan view of a spring 25 to be housed in the spring storage sections 23A and 23B and FIG. 4b is its side view. In the figures, the reference numeral 26 denotes a coil part, 27 and 27' arms, 28 and 28' bent parts, and 29 and 29' abutting parts.

In this figure, the spring 25 is a counter-clockwise torsion coil spring. Part of the arms 27 and 27' that elongate from both ends of the coil part 26 are bent to form the bent parts 28 and 28' and the ends of these bent parts 28 and 28' are rounded to form the abutting parts 29 and 29'. As is apparent from FIG. 4a, the angle included between the arms 27 and 27' elongating from the coil part 26 is set to be little narrower than 180° on the coil part 26 side; the bent part 28 is bent from the arm 27 toward the side opposite to the coil part 26 in a plan which is perpendicular to the center axis 30 of the coil part 26 and includes the arm 27, and its angle formed with the arm 27 is set at degrees larger than 90°. The bent part 28' is also bent toward the side opposite to the coil part 26 in a plane which is perpendicular to the o center axis 30 of the coil 26 and includes the arm 27' and its angle formed with the arm 27' is set at an angle equal to the angle between the arm 27 and the bent part 28. Furthermore, as is apparent from FIG. 4b, the abutting part 29 is formed by rounding the end of the bent part 28 toward the side opposite to the coil part 26 with respect to a plane including the arm 27 and the bent part 28, in a plane which is parallel to the center axis 30 of the coil part 26 and includes the bent part 28. Similarly, the abutting part 29' is formed by rounding the end of the bent part 28' toward the side opposite to the coil part 26 with respect to a plane including the arm 27' and bent part 28; in a plane which is parallel to the center axis 30 of the coil part 26 and includes the bent part 28'. Incidentally, the arms 27 and 27' have the same length, the bent parts 28 and 28' also have the same length, and the abutting parts 29 and 29' provided the same size and shape. The width 1 obtained by subtracting the thickness of the arm 27 (or 27') from the distance between the two ends of the coil part 26 shown in FIG. 4b is a little larger than the height of the side walls 15A and 15B of the upper casing 2 and lower casing 3 shown in FIG. 1b and FIG. 2b, respectively.

Since the spring 25 is of the above-mentioned construction, the spring 25 is symmetrical with respect to an axis 31 which meets the center axis 30 of coil part 26 to bisect the angle formed between the arms 27 and 27' and crosses the longitudinal center of the coil part 26. Therefore, even if the spring 25 in the condition shown in FIG. 4a is turned through 180° relative to this axis, the same condition as in FIG. 4a is obtained.

Figure 5A:
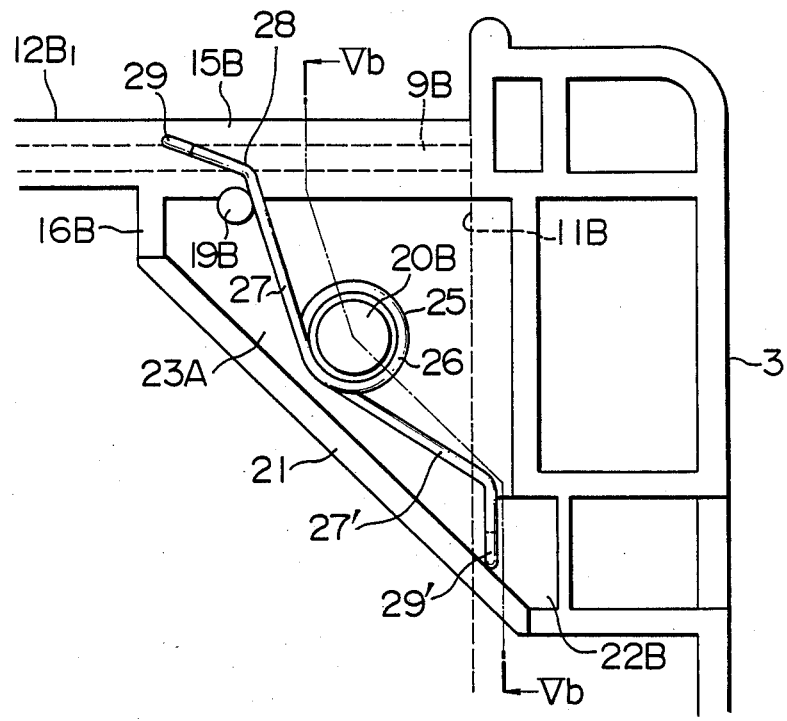
FIGS. 5a and 5b are plan and side views, respectively, illustrating the above-mentioned spring mounted in the disk cartridge which is partly shown.
Figure 5B:
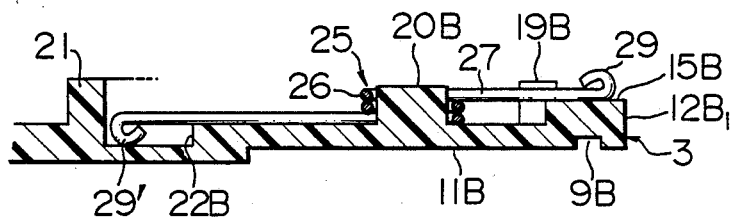

FIGS. 5a and 5b illustrate the spring 26 mounted in the spring storage section 23A (FIG. 3a or 3b) of the lower casing 3; FIG. 5a is a plan view and FIG. 5b is a sectional view as seen from the one-dot dash line in the direction of the arrow. The same reference numerals as used in the above-mentioned figures are given to corresponding parts in FIGS. 5a and 5b.

In these figures, the coil part 26 of the spring 25 is caused to fit on the boss 20B. The lower, arm 27' of this spring 35 is directed toward the locking hole 22B and the abutting part 29' at the end of the arm 27' is inserted in this locking hole 22B. The upper arm 27 of the spring 25 is directed toward the side wall 15B and is in contact with the stopper 19B. The bent part 28, including the abutting part 29, is positioned on the side wall 15B.

In this condition, the spring 25 is twisted and the downward rounded abutting part 29' is pressed against the side of the locking hole 22B with the reacting force resulting from this torsion and the arm 27 is also pressed against the stopper 19B.

For the other spring storage section 23B (FIG. 3a) also, the same spring 25 is installed in the upper casing 2 (FIG. 1b) in the same manner. As described earlier with reference to FIG. 4a, the spring 25 shows the same shape and condition even if it is turned through 180°: therefore, the same spring 25 can be installed in the spring storage sections 23A and 23B.

The cartridge casing according to this invention was described above. Next, the shutter according to this invention is described.

FIGS. 6a through 6d illustrate the shutter 7: FIG. 6a is a top view, FIG. 6b a front view, FIG. 6c a left-hand sectional view, and FIG. 6d a right-hand sectional view. In these figures, the reference numerals 7A and 7B denote shutter walls, 71A, 71B cover parts, $8A_1$, $8A_2$, $8B_1$ and $8B_2$ operatings 32A and 32B pawls, 33 a connecting part, 34 the centerline, 35A and 35B abutting plates, 36A and 36B opening member engaging parts, and 37A and 37B reinforcing members.

In these figures, the shutter walls 7A and 7B are parallel to each other and are connected by a connecting part 29 to form a U-like shape. The distance between these shutter walls 7A and 7B is set at a value a little higher than but almost equal to the value of thickness between the shutter slide parts 11A and 11B in the cartridge casing (FIGS. 3a and 3b). The shutter wall 7A is provided with the two rectangular openings $8A_1$ and $8A_2$ on both sides of the cover part 71A symmetrically with respect to the centerline 34 indicated by the one-dot-dash line (FIG. 6a). The length and width of these openings $8A_1$ and $8A_2$ are larger than those of the head entry aperture 6A (FIG. 1a) and heat entry aperture 6B (FIG. 2a) of the cartridge casing and the distance between the openings $8A_1$ and $8A_2$ is also larger than the width of the head entry apertures 6A and 6B. The shutter wall 7b is also provided with the same cover plate 71B and two openings $8B_1$ and $8B_2$ The opening $8B_1$ is opposed to the opening $8A_1$ in the shutter wall 7A, the opening $8B_2$ being similarly opposed to the opening $8A_2$, and the cover part 71B also similarly opposed to the cover part 71A.

Moreover, as is apparent from FIGS. 6a and 6b, the pawl 32A is provided at the upper left-hand corner on the internal surface of the shutter wall 7A. Similarly, the pawl 32B is installed at the upper right-hand corner on the internal surface of the shutter wall 7B.

The opening member engaging parts 36A and 36B are provided at both ends of the connecting part 33 in such a manner that they protrude from the shutter walls 7A and 7B; these opening member engaging parts 36A and 36B are mechanically reinforced by the reinforcing members 37A and 37B, respectively.

Furthermore, as is apparent from FIGS. 6c and 6d, the abutting plate 35A is provided at the junction between the connecting part 33 and the shutter wall 7A on the right-hand side of the shutter 7. On the left-hand side of the shutter 7 also, the same abutting plate 35B as mentioned above is installed at the junction between the connecting part 33 and the shutter wall 7B. The length of the abutting plate 35a in the longitudinal direction in the figure is a little smaller than the level difference between the side edges $12A_1$ and $12A_2$ of the shutter slide part of upper casing 2 (FIG. 1a) in the cartridge casing 1. Similarly, the length of the abutting plate 35B in the longitudinal direction in the figure is also a little smaller than the level difference between the side edges $12B_1$ and $12B_2$ of the shutter slide part 11B of lower casing 3 (FIG. 2a). Furthermore, the length of the abutting plate 35A in the transverse direction in the figure is a little smaller than the sum of the thickness of shutter slide part 11A and the height of side wall 15A (FIG. 1b) of the upper casing 2. Similarly, the length of the abutting plate 35 in the transverse direction in the figure is a little smaller than the sum of the thickness of shutter slide part 11B and the height of side wall 15B (FIG. 2b) of the lower casing 3.

This shutter of the above-mentioned construction is so mounted as to sandwich the cartridge casing 1 in such a way that the internal surface of the shutter wall 7A faces the shutter slide part 11A of the cartridge casing shown in FIG. 3a and similarly the internal surface of the shutter wall 7B faces the slide part 11B thereof In this case, the internal surface of the connecting part 33 of the shutter 7 makes contact with the side edge $12A_1$ of the shutter slide part 11A of upper casing 2 and the side edge $12B_1$ of the shutter slide part 11B of lower casing 3. Furthermore, the pawl 32A installed on the internal surface of the shutter wall 7A fits in the guide groove 9B installed in the upper casing 2 (FIG. 1a) of the cartridge casing 1. Similarly, the pawl 32B installed on the internal surface of the shutter wall 7B fits in the guide groove 9B installed in the lower casing 3 (FIG. 2a). As mentioned above, the shutter 7 is mounted, in FIG. 3a, on the shutter slide parts 11A and 11B of the cartridge casing 1; this shutter 7 is slidable along the guide grooves 9A and 9B.

FIG. 7 is a view of the shutter 7 mounted on the cartridge casing 1 as seen from the side of the upper casing 2 and the same reference characters as used in the above-mentioned figures are given to corresponding parts in FIG. 7.

In this figure, the torsion coil springs 25 in FIG. 4 to be housed in the spring storage sections 23A and 23b are denoted by the reference numerals 25A and 25B, respectively. When the shutter 7 is mounted on the cartridge 1, the abutting part 29A at the end of the arm 27A of torsion coil spring attached to the boss 20B installed in the spring storage section 23A in the lower casing 3 of cartridge casing 1 abuts against the right-hand side of the shutter 7 due to the action of release from the torsion condition, and the abutting part 29B of the torsion coil spring 25B installed in the spring storage section 23B also abuts against the left-hand side of the shutter 7 due to the same action. When these torsion coil springs 25A and 24B have the same resiliency, the corresponding abutting parts 29a and 29B abut against the right-hand side and left-hand side of the shutter 7, respectively, the corresponding arms 27A and 27B are a little apart from the stoppers 19B and 19A, respectively, and the balance between the leftward urging force of the torsion coil spring 25A and the rightward urging force of the torsion coil spring 25B is kept in the shutter 7, with the result that the shutter 7 rests in the middle of the shutter slide part 11A. On this occasion, the cover part 71A between the openings $8A_1$ and $8A_2$ in the shutter wall 7A closes the head entry aperture 6A in the shutter slide part 11A. The same applies also to the shutter wall 7B (FIG. 6b) on the side opposite to the shutter wall 7A and the head entry aperture 6B (FIG. 2a) of the lower casing 3 is also closed.

When either of the torsion coil springs 25A and 25B, for example, the torsion coil spring 25A has greater resiliency than the torsion coil spring 25B, the shutter 7 moves leftward due to the urging force of the torsion coil spring 25A against the urging force of the torsion coil spring 25B. In this case, however, the arm 27A of the torsion coil spring 25A immediately abuts against the stopper 19B and the urging force of the torsion coil spring 25a disappears, with the result that the torsion coil spring 25b tends to move the shutter 7 rightward. In this manner, the shutter 7 rests with the balance of urging force between the torsion coil springs 25A and 25B by the action of the stoppers 19A and 19B. Because the distance between the openings $8A_1$ and $8A_2$ in the shutter wall 7a of shutter 7 and the distance between the openings $8B_1$ and $8B_2$ in the shutter wall 7B are somewhat wider than the width of the head entry apertures 6A and 6B, these head entry apertures 6A and 6B are kept closed even if the balance of urging force is kept between the torsion coil springs 25A and 25B as mentioned above.

When a disk cartridge of the above-mentioned construction is loaded in a recording and reproduction apparatus, the opening member engaging part 36B is pressed by a shutter opening member (not shown) if this shutter opening member is provided on the right side in front of the shutter 7. Therefore, the shutter 7 is guided right-ward by the pawls 32A and 32B (FIG. 6) along the guide grooves 9A and 9B (FIG. 2) against the urging force of the torsion coil spring 25A. However, the arm 27b of the torsion coil spring 25B immediately abuts against the stopper 19a when the shutter 7 moves rightward, and the torsional condition is not released any more.

Figure 8:
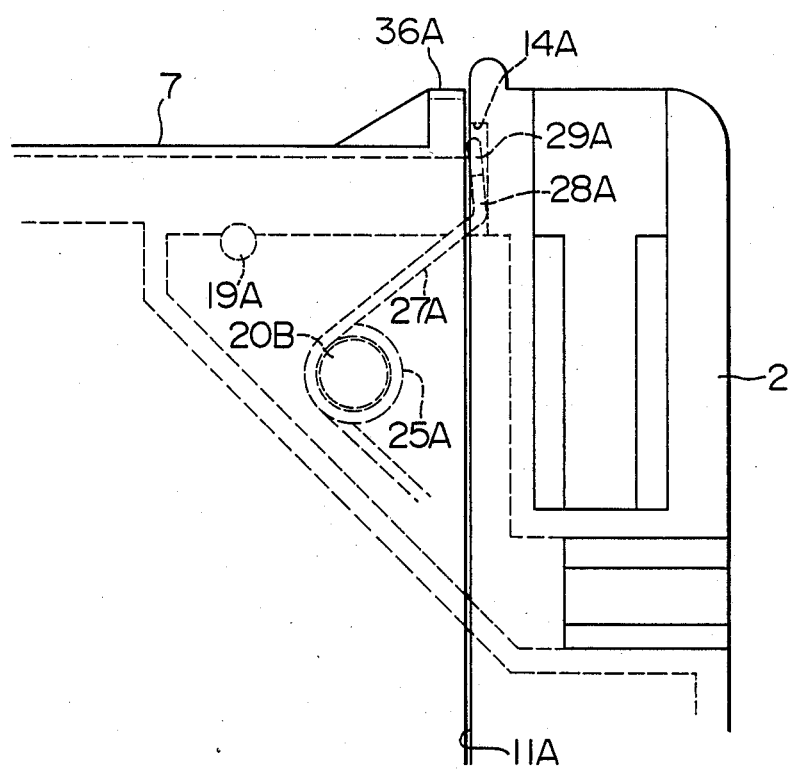

With the rightward movement of the shutter 7 proceeding, the abutting part 29A of the torsion coil spring 25A is pressed by the shutter and moves on an arcuate locus while it is springing out of the clearance 23A (FIG. 3b). When the shutter 7 reaches the right end of the shutter slide part 11A and stops there, the bent part 28A of the torsion coil spring 25A has entered the recess 14A. At this time, the head entry aperture 6A is opened by the opening $8A_2$ in the shutter wall 7A. Incidentally, the condition of the spring storage section 23A on this occasion is illustrated in FIG. 8. It is needless to say that the head entry aperture 6B in the upper casing (FIG. 2a) is also opened by the opening $8B_2$ in the shutter wall 7B.

This enables the head to be inserted through the head entry aperture 6A and the pad to be inserted through the head entry aperture 6b and it is possible to record or reproduce information on one of the two recording surfaces of the disk recording medium 4.

When recording and reproduction are conducted with the other recording surface of the disk recording medium 4, the disk recording medium 4 is loaded in the recording and reproduction apparatus by reversing the condition shown in FIG. 7. In this case, FIG. 7 is completely valid simply by replacing the letter A with B for the reference characters in the figure. On this occasion, the opening member engaging part 31a of the shutter 7 is pressed similarly by the same shutter opening member and the head entry apertures 6A and 6B are opened by the openings $8A_1$ and $8B_1$, respectively.

Partly due to the movement of the shutter, the abutting part 29A of the torsion coil spring 25A abuts against the abutting plate 35A, the right end of the connecting part 33 and the right-hand side of the opening member engaging part 36A shown in FIG. 6d. Similarly, partly due to the movement of the shutter 7, the abutting part 29B of the torsion coil spring 25B also abuts against the abutting plate 35B, the left end part of the connecting part 33 and left-hand side surface of the opening member engaging part 36B shown in FIG. 6c. In this embodiment, the shutter is so mounted in the cartridge casing as to usually rest in the middle of the slidable area in the cartridge casing and to be able to move in two directions from this rest position, as mentioned above. Both walls of the shutter are provided with two openings in these directions of movement. When the shutter is in the rest position, the head entry apertures provided in the upper and lower casings of the cartridge casing can be closed simultaneously by the areas between the two openings in each shutter wall. Furthermore, the head entry apertures of the upper and lower casings can be opened simultaneously even if the shutter is moved in either direction from the rest position.

As is apparent from the foregoing, therefore, when recording or reproduction is conducted with one of the recording surfaces of a double-sides disk recording medium, the head entry apertures provided in the upper and lower casings of the cartridge casing can be opened simultaneously, by simply moving the shutter in one direction with respect to a recording and reproduction apparatus irrespective of whether the upper casing of the cartridge casing faces upward or downward. Accordingly, the recording and reproduction apparatus may be provided with only one mechanism for moving the shutter in one direction to open the head entry apertures as the shutter opening member. Furthermore, because the shutter is moved by pressing the opening member engaging parts provided at the ends of the shutter and the width of the shutter in the moving direction is sufficiently wide due to the existence of the two openings in each shutter wall, the shutter opening member can be arranged in a position that does not interface with other parts such as carriage. Thus, design conditions for a recording and reproduction apparatus, etc., can be relaxed.

Figure 18A:
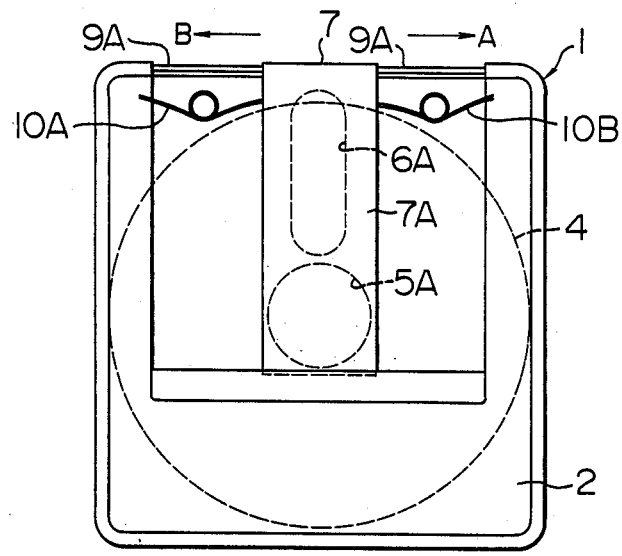
FIGS. 18a and 18b are plan views illustrating the upper and lower casings of another conventional disk cartridge, respectively.
Figure 18B:
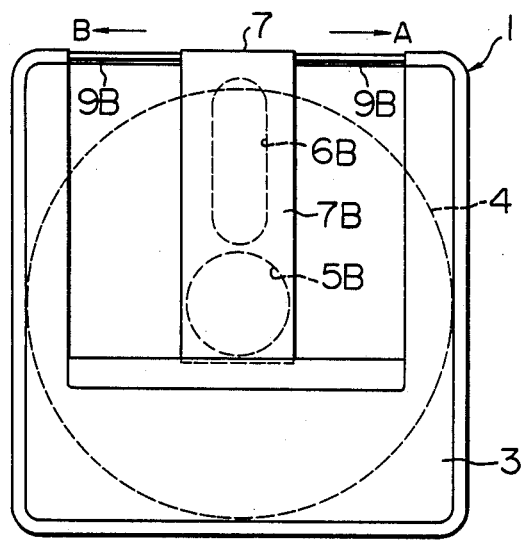

In the example of a conventional disk cartridge shown in FIGS. 18a and 18b, it was explained that the shutter opening member can be so arranged as not to interface with the carriage if engaging parts elongating in the moving direction of the shutter 7 are provided on the shutter walls 7A and 7B. The greatest disadvantage of this case was that these engaging parts are mechanically very weak and a smooth movement of the shutter 7 was impossible. In the shutter of the above-mentioned embodiment of the present invention, however, the two openings provided in each shutter wall enable the shutter width in the moving direction to be widened, whereby the shutter can be moved by pressing the end thereof as mentioned above. At the same time, each shutter wall is provided with enclosures (ribs) that enclose the openings. Accordingly, the construction is mechanically strong and the shutter can move smoothly.

Furthermore, because the pawls 32A and 32B (FIG. 6a) provided on each shutter wall of the shutter being fitted in the guide grooves 9A and 9B (FIGS. 1*l* and 1*b*) formed in the upper and lower casings of cartridge casing, the shutter moves along the guide grooves 9A and 9B. However, the shutter scarcely rattles even if there are backlashes between the pawls 32A and 32*b* and the guide grooves 9A and 9B, because the shutter width in the moving direction is sufficiently large and the pawls 32*a* and 32B are provided at both ends of the shutter in its moving direction at a sufficiently long distance from each other.

According to the present invention, the shutter width is increased in its moving direction and openings are provided on both sides of a cover part on each shutter wall, as described above. Therefore, the shutter is mechanically strong and deformation, such as strain, does not occur when the shutter opening member is driven. Furthermore, the effect of backlashes between the guide grooves and parts that fit therein on the shutter is reduced and the shutter can move smoothly. By setting the rest position of the shutter so as to close the head entry apertures of the cartridge casing between the above-mentioned two openings, the head entry apertures can be opened with either of the two openings when the shutter is to be moved from the rest position in either direction. Therefore, even when recording or reproduction is conducted with either of the two recording surfaces of a double-sided recording medium, the head entry apertures can be opened by moving the shutter in one direction and only one shutter opening member is required.

If a plurality of the first ribs extending from the inside to the outside so as to cross the recording area of disk are provided on the internal surface of either of the upper and lower casings composing the cartridge casing, at least one second rib, which is placed between the first ribs and extends from the inside to the outside so as to cross the recording area of the disk, is provided on the internal surface of the other casing, and a cleaning sheet is brought into contact with the disk surface through these first and second ribs, then it is possible to bring the cleaning sheet into positive contact with the disk surfaces in these projecting positions. Therefore, the disk cleaning effect is exhibited by itself positively and the vertical movement accompanied with rattling associated with the rotation of the disk cases.

Figure 9:
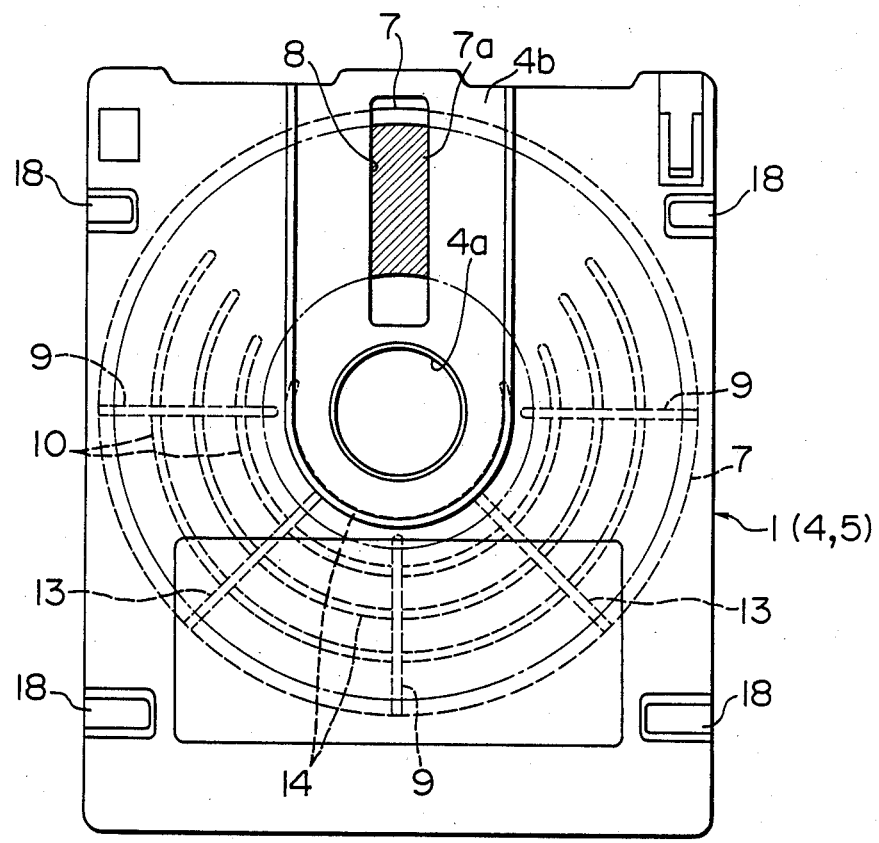
Figure 10:
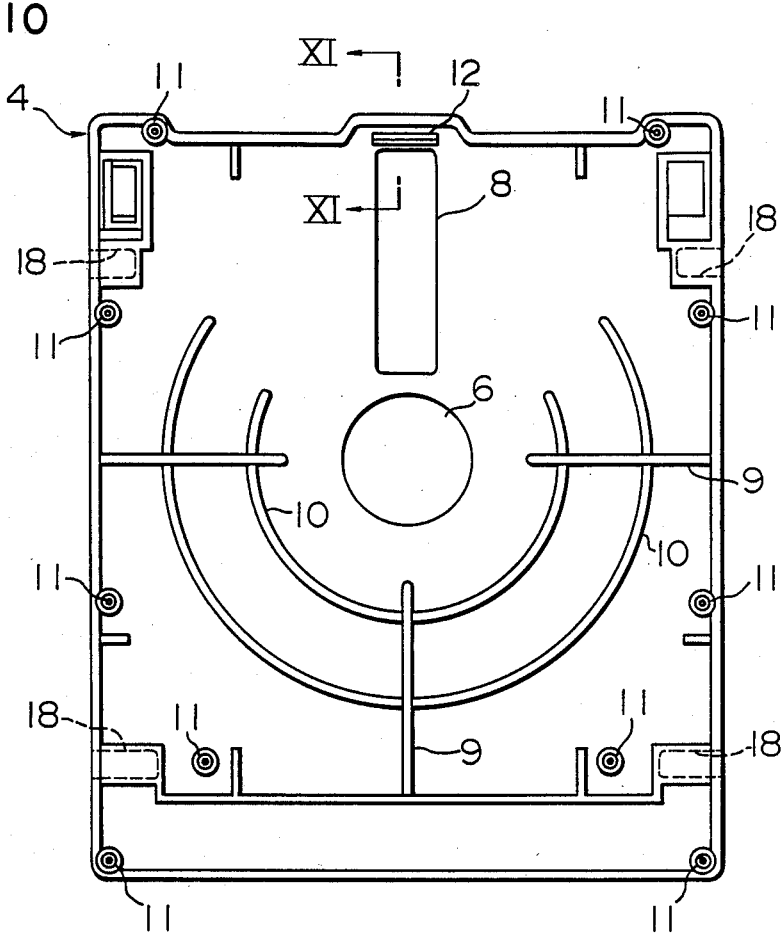
Figure 11:
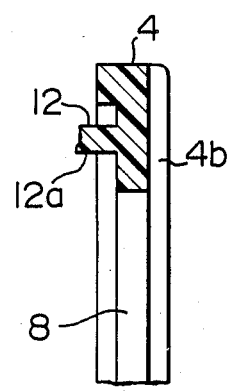
Figure 12:
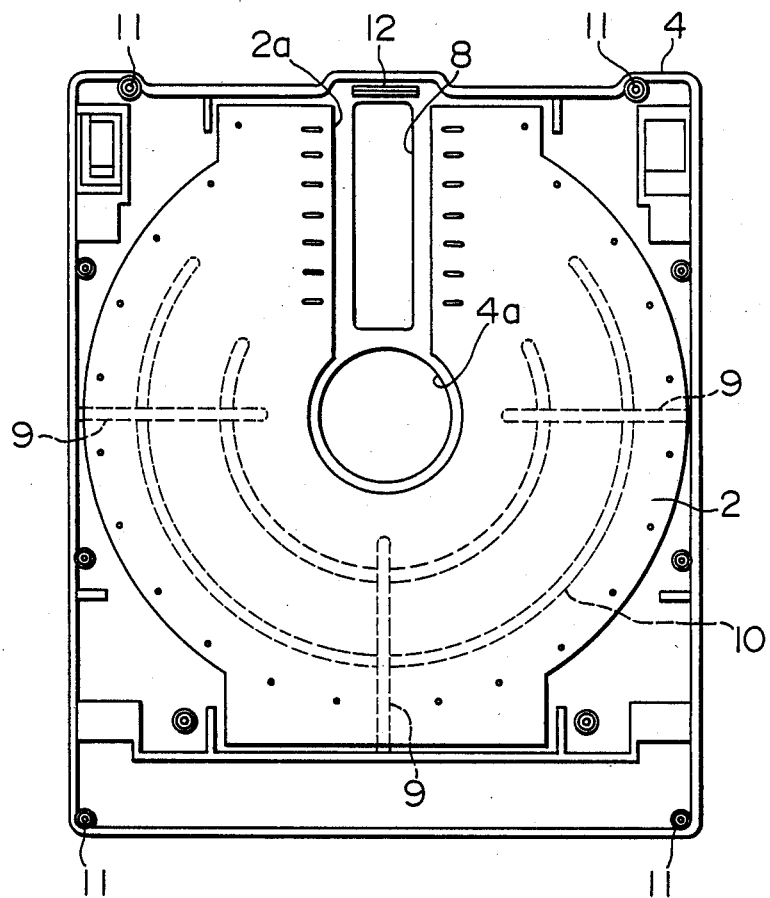
Figure 13:
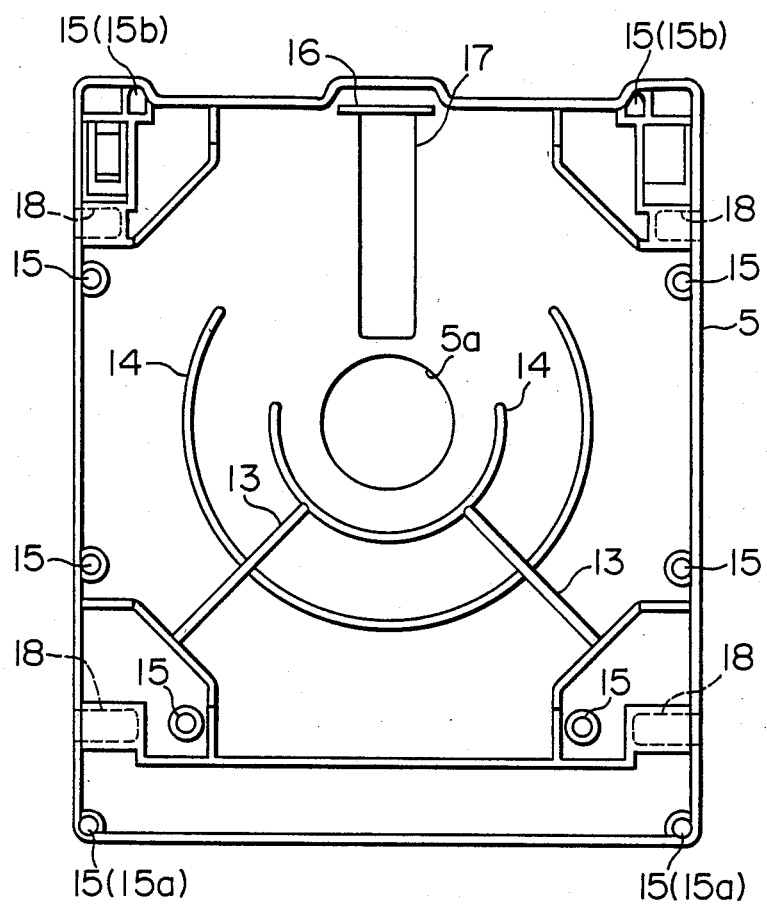
Figure 17A:
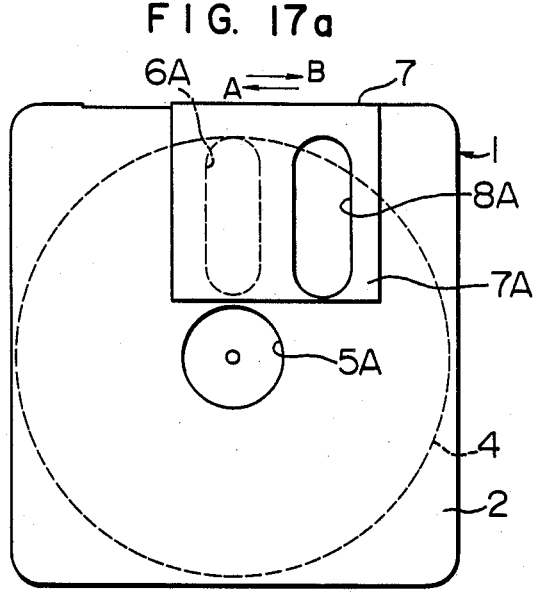
FIGS. 17a and 17b are plan views illustrating the upper and lower casings of a conventional disk cartridge, respectively.
Figure 17B:
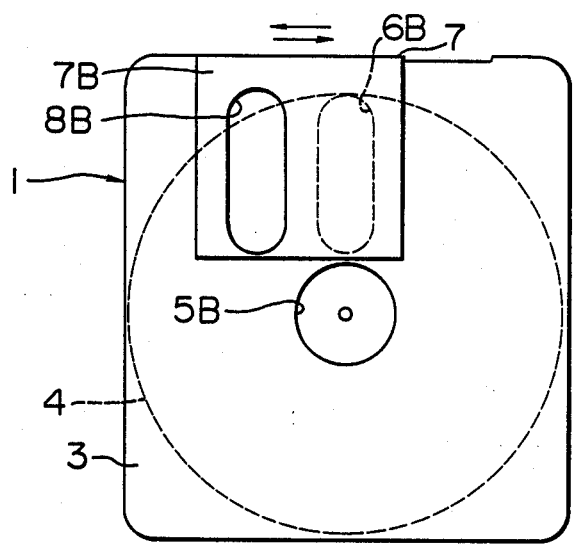

A second embodiment of the present invention will be hereinbelow described with reference to the drawings. FIG. 9 is a plan view illustrating a disk cartridge in one embodiment of the present invention. FIG. 10 is a bottom view of the upper casing of the disk cartridge. FIG. 11 is an enlarged sectional view along the line A—A of FIG. 10. FIG. 12 is a bottom view illustrating the above-mentioned upper casing in which a cleaning sheet is attached. FIG. 13 is a plan view of the lower casing of the disk cartridge. FIG. 14 is a plan view illustrating the lower casing in which a cleaning sheet is attached. FIG. 15 is a sectional view illustrating a joint part in the vicinity of the disk head entry aperture of the disk cartridge. FIG. 16 is a sectional view illustrating an essential part of the disk cartridge. The same reference characters as used in FIG. 17 are given to corresponding parts in these drawings.

As with the conventional disk cartridge, the disk cartridge in this embodiment essentially comprises a cartridge casing 1 and a magnetic disk 7 which is rotatably housed therein. In this magnetic disk 7, as shown in FIG. 9, a recording area 7a in which data is magnetically recorded is formed in a predetermined range.

The cartridge casing 1 is made by welding an upper casing 4 and a lower casing 5 into one integrated structure and these casings are made of, for example, hard synthetic resin, such as styrol resin.

As shown in FIG. 10, a circular opening 4a is provided almost in the center of the upper casing 4 and a rectangular magnetic head entry aperture 8 is provided outside the opening 4a. The opening 4a and magnetic head entry aperture 8 are positioned within a recess 4b which is steppedly formed in the top surface of the upper casing 4. Therefore, when a magnetic head (not shown in the figure) is inserted in a magnetic head entry aperture 8, the displacement of the magnetic head becomes as small as possible due to the existence of this recess 4b and the rolling of the magnetic head can be prevented. The numeral 18 denotes reference level parts which are recessed steppedly from the surface of the upper casing 4 (and the lower casing 5 which will be described later). Because the reference level parts 18 are thus formed within the recess, the unnecessary sliding of the reference level parts 18 is prevented when the disk cartridge is loaded on a recording and reproduction apparatus. As a result, the accuracy of the reference level is kept for a long time.

The internal surface of the upper casing 4 is of such a construction as to include a plurality of the first linear ribs 9 extending radially outward from the above-mentioned opening 4a and having a length larger than that of the recording area 7a of the magnetic disk 7, preferably, three first linear ribs 9 as illustrated, which are arranged at intervals of 90° including the above-mentioned magnetic head entry aperture 8. Furthermore, in the area excluding the magnetic head entry aperture 8 and its surrounding part, the first arcuate ribs which are a little lower than the above-mentioned first linear ribs are formed almost concentrically with respect to the opening 4a. The number of the first arcuate ribs is one or more, preferably several. The peripheral part of internal surface of the upper casing 4 is provided with a plurality of bosses 11 and a projecting wall 12 which are adapted to weld the upper casing 4 to the lower casing, which will be described later. This projecting wall is positioned in the vicinity of the above-mentioned magnetic head entry aperture 8 and has a projecting welding margin 12a at its end, as shown in FIG. 11.

As shown in FIG. 12, the cleaning sheet 2 is firmly attached to the internal surface of the upper casing of the above-mentioned construction so as to cover the above-mentioned first linear ribs 9 and first arcuate ribs 10 and cut-outs are formed in part of this internal surface to expose the magnetic head entry aperture 8. This cleaning sheet 2 is made of, for example, rayon-polyester mixed paper or unwoven fabric of synthetic fiber and its peripheral part is partially connected to the upper casing 4 by supersonic welding thermal fusing, as shown by the dots in the figure.

As shown in FIG. 13, the lower casing 5 is also provided with an opening 5a and a magnetic head entry aperture 17 to adapt to the above-mentioned upper casing 4. The internal surface of this lower casing 5 is of such a construction as to include one or more second linear ribs 13 having a length at least larger than that of the recording area 7 of the magnetic disk 7 and extending radially outward from the opening 5a, preferably two linear ribs 13 as illustrated, which are so arranged as to be almost intermediate between the first linear ribs 9. Furthermore, in the area excluding the magnetic head entry aperture 17 and its surrounding part on the internal surface of the lower casing 5, the second arcuate ribs 14 a little lower than the second linear ribs 13 are formed almost concentrically with respect to the opening 5a. The number of the second arcuate ribs is one or more, preferably several. These second arcuate ribs 14 are so arranged as to be almost intermediate between the above-mentioned two first arcuate ribs 10 and between the inner first arcuate rib 10 and the opening 4a, respectively.

Furthermore, the peripheral part of internal surface of the lower casing 5 is provided with a plurality of receiving parts 15 permitting the insertion of bosses 11 of the upper casing 4 and a projecting wall 16, of these receiving parts 15, the inside diameter of the receiving parts 15 at the lower right- and left-hand corners in FIG. 13 (hereinafter given the reference numeral 15a) is almost equal to that of the bosses 11. The two upper receiving parts 15 (hereinafter given the reference character 15b) are elongated vertically in the figure and the remaining receiving parts 15 are formed in the shape of a cylinder having an insertion hole somewhat large than the one side diameter of the busses 11.

As shown in FIG. 14, a cleaning sheet 3 having therein cut-outs 3a is placed also on the internal surface of the lower casing 5 of the above-mentioned construction so as to expose the magnetic head entry aperture 17 and cover the second linear ribs 13 and second arcuate ribs 14 and its peripheral part is thermally fused or jointed by supersonic welding to the lower casing 5.

The upper casing 4 and lower casing 5 with the cleaning sheet 2 and cleaning sheet 3 firmly fixed thereon are incorporated into one piece by ultrasonic vibration with the magnetic disk 7 sandwiched therebetween. On this occasion, the two casings 4 and 5 are positioned with high a degree of accuracy because the two bosses 11 at both lower corners and the receiving parts 15a serve as reference positions and the upper two bosses 11 and the elongated receiving parts 15a serve as relief positions. The two casings 4 and 5 are joined into one piece at their peripheral parts by the ultrasonic welding of the thus positioned bosses 11 to the abutting surfaces of receiving parts 15 and those of both projecting walls 12 and 16. Especially, in the part over the magnetic head entry apertures 8 and 17 which are thinner than the other part and has low strength, the welding margin 12a of the projecting wall 12 melts to strongly integrate both projecting walls 12 and 16, as shown in FIG. 15. Therefore, these projecting walls serve as reinforcing ribs.

When the upper and lower casings 4 and 5 are welded into one integrated part, the surfaces of the magnetic disk housed in the cartridge casing 1 are brought into contact with both cleaning sheets 2 and 3. In this case, as shown in FIG. 16, the cleaning sheets 2 and 3 are elastically pressed against the magnetic disk 7 in the positions of the first and second linear ribs 9 and 13 extending radially from the openings 4a and 5a of the upper and lower casings 4 and 5, respectively. Because these first and second linear ribs 9 and 13 are arranged alternately up and down at predetermined intervals in the circumferential direction (direction of rotation) of the magnetic disk 7, the cleaning sheets 2 and 3 and the magnetic disk 7 are elastically in slidable contact with each other in the positions of the linear ribs 9 and 13 due to the flexibility of the magnetic disk 7 when the magnetic disk 7 rotates during the use of the disk cartridge. As a result, the surfaces of the magnetic disk 7 are thoroughly cleaned by the cleaning sheets 2 and 3 and troubles caused by the adhering of dust, etc., are positively eliminated. Moreover, in this second embodiment of the present invention, the first and second arcuate ribs 10 and 14 which a little lower than both linear ribs 9 and 13 are alternately provided in the radial direction of the magnetic disk 7 at predetermined intervals. Therefore, these arcuate ribs 10 and 14 prevent the vertical movement of the magnetic disk 7, thus ensuring stable rotation of the magnetic disk 7 and enabling good magnetic recording and reproduction possible.

In the above-mentioned embodiment, the middle one out of the three linear ribs 9 is positioned 180° opposed to the magnetic head entry aperture 8 and the remaining two are so placed as to be almost intermediate between the magnetic head entry aperture 8 and the first linear rib 9 opposed thereto. Therefore, pressing forces from the magnetic head (not shown) at the magnetic head entry apertures 8 and 17 and pressing forces from the cleaning sheet at the first linear rib 9 as mentioned above, act on the rotating magnetic disk 7 at equal intervals of almost 90°. Therefore, the deformation of the magnetic disk 7 can be suppressed by making uniform these external forces acting on the magnetic disk.

Incidentally, the above-mentioned embodiment was described by referring to a case where the first linear ribs 9 are provided in the upper casing 4 and the second linear ribs 13 in the lower casing. It is needless to say that a similar effect is obtained even if this relationship is reverse.

Furthermore, the number of the first and second linear ribs 9 and 13 is not limited to the example of the above-mentioned embodiment. What is important is that these linear ribs are provided in the upper and lower cases 4 and 5 in a manner that they are alternately arranged in the circumferential direction of the magnetic disk 7 at predetermined intervals.

In addition, the above-mentioned embodiment was described concerning a case where the first and second linear ribs 9 and 13 are so arranged as to extend radially from the openings 4a and 5a. These ribs may not always be linear, nor may they extend radially. What is important is that these ribs are so formed as to cross the recording area of the magnetic disk.

As described above, according to the present invention, it is possible to obtain a disk cartridge in which the disk cleaning effect can be exhibited by itself positively even if the disk cartridge comprises hard casings and it is also possible to obtain a disk cartridge which shows stable characteristics because the vertical movement of the disk accompanied with rattling associated with its rotation can be prevented.

What is claimed is:

1. A disc cartridge comprising a casing for housing a double-sided disk recording medium therein and having two side walls each of which is formed therein with a head entry aperture and a spindle hole, and a U-shaped slidable shutter having two shutter walls between which said casing is operatively arranged and a connecting part between both walls, each of said shutter walls being formed therein with two openings spaced from each other with a cover part therebetween, said cover part normally closing an associated one of said entry apertures prior to insertion of the cartridge into a reproducing and recording machine, whereby one of said openings is operatively arranged to open said associated head entry aperture in each side wall when said slidable shutter is moved in one of two directions.

2. A disk cartridge as claimed in claim 1, wherein springs are provided on both sides of said shutter, and said shutter is held in the middle of the cartridge under the bias of the springs.

3. A disk cartridge as claimed in claim 1, wherein engaging parts are provided in both side end parts of said connecting part.

4. A disk cartridge as claimed in claim 3, the surface of the forced part of the shutter has a substantially recessed form defined by said connecting part of the shutter and said engaging parts on both sides.

5. A disk cartridge as claimed in claim 4, wherein reinforcing parts connected to said connecting part are formed on the side opposite to the engaging surfaces of said engaging parts.

6. A disk cartridge as claimed in claim 1, wherein said shutter is made of synthetic resin.

7. A disk cartridge comprising a casing provided with head entry apertures, a disk recording medium rotatably housed in the casing, a shutter for opening and closing the head entry apertures of the casing, and springs for elastically urging the shutter in the closing direction, wherein said shutter has at least cover parts for closing the head entry apertures and a front plate integrally connected to the cover parts and slidable along the front surface of the casing, and an engaging part adapted to engage with a shutter opening member is provided at the end of at least one side of the connecting part so as to project forward from said connecting part.

8. A disk cartridge as claimed in claim 7, wherein engaging parts are provided at the ends of said connecting part, and a surface of said connecting part has a substantially recessed form defined between this front plate and said engaging parts on both sides.

9. A disk cartridge as claimed in claim 7, wherein reinforcing parts connected to said connecting part are provided on the side opposite to the engaging surfaces of said engaging parts.

10. A disk cartridge as claimed in claim 7, wherein said shutter is made of synthetic resin.

11. A disk cartridge comprising a casing provided with head entry apertures on opposite sides of the casing, a disk recording medium rotatably housed in the cartridge casing, a shutter with two openings facing each of the opposite sides of the casing for opening and closing an associated one of the head entry apertures of the casing, and springs for elastically urging the shutter in the closing direction, wherein spring abutting surfaces are provided at the ends of said shutter, the springs having bases located in the casing and free ends resiliently abut said spring abutting surfaces, and the free ends of the springs having contact positions on said spring abutting surfaces are moved by the shutter sliding from the closing position to the opening position.

12. A disk cartridge as claimed in claim 11, wherein the shutter is slidable in the two right and left directions from the middle of said cartridge casing, said springs are arranged at the right and left edges of the shutter, spring abutting areas are provided at both ends of the shutter, and an engaging surface against which a shutter opening member abuts is provided before the spring abutting areas so that it does not interfere with the movement of the free ends of springs resulting from the sliding of said shutter.

13. A disk cartridge as claimed in claim 11, wherein the abutting surface against which said shutter opening member abuts is continuously provided on the same plane as with the spring abutting areas.

14. A disk cartridge as claimed in claim 11 or claim 13, wherein the abutting surface against which said shutter opening member abuts protrudes forward from the front side edge of the cartridge casing.

15. A disk cartridge as claimed in claim 14, wherein each of said springs comprises a coil part and this coil part of the spring is locked in the cartridge casing.

16. A disk cartridge as claimed in claim 11, wherein the cartridge casing is provided with recesses for receiving the free ends of said springs when said shutter has reached the opening position.

17. A disk cartridge for housing a double-sided disk recording medium comprising two opposed side walls, each of said side walls provided with a head entry aperture and a spindle hole formed therein, and a U-shaped slidable shutter operatively arranged on said casing so as to enable said head entry apertures to open and close, springs for urging the shutter arranged on both sides of the shutter, a shutter opening member, and abutting parts against which the shutter opening member abuts, projecting forward from the front side edge of the casing at both ends of the casing, wherein said casing comprises an upper casing portion and a lower casing portion, the forward side edge of one casing portion protrudes more forward than that of the other opposed casing portion at the right or left end with respect to the center of the plane of the casing, said protruding side edge serving as a guide for said shutter opening member, and during the closing of the head entry aperture by the shutter, the shutter-side end of said springs for urging the shutter protrudes more forward than said forward side edge at the rear and does not protrude more forward than said protruding side edge.

18. A disk cartridge as claimed in claim 17, wherein the forward side edge of the lower casing protrudes more forward than the opposed forward side edge of the upper casing at the left end of said cartridge casing and the forward side edge of the lower casing is positioned in rear of the opposed forward side edge of the upper casing at the right end of the cartridge.

19. A disk cartridge as claimed in claim 17, wherein each of said springs for urging the shutter is a coil spring and the coil part of the spring is supported by the cartridge casing.

20. A disk cartridge as claimed in claim 17, wherein the outer surface of the portion where the forward side edge protruding forward from said cartridge casing is formed, is provided with a shutter guide groove parallel to the forward side edge.

* * * * *